C. DANIEL.
Wheel-Cultivator.
No. 57,484. Patented Aug. 28, 1866.
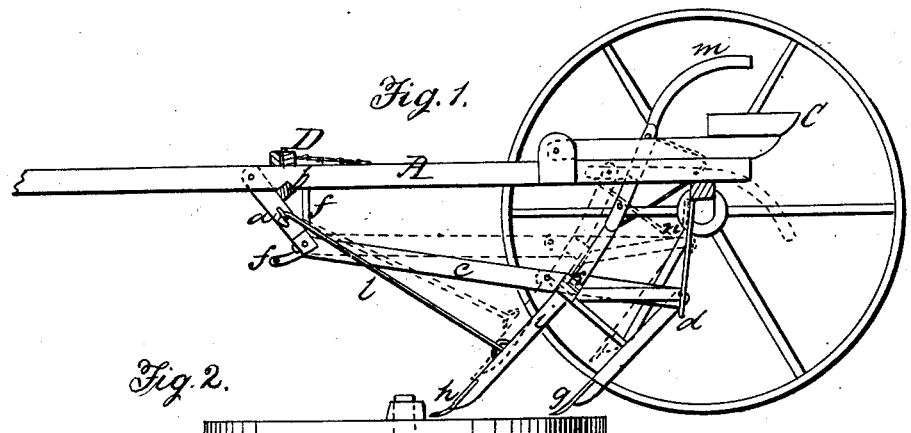
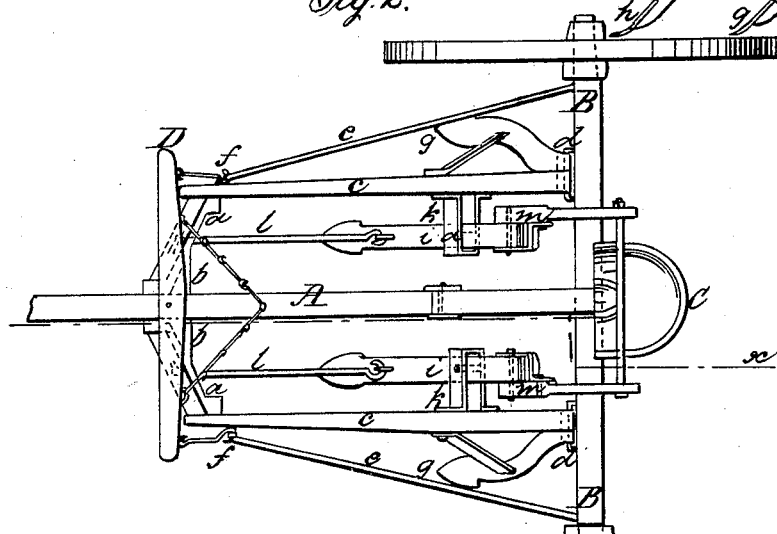
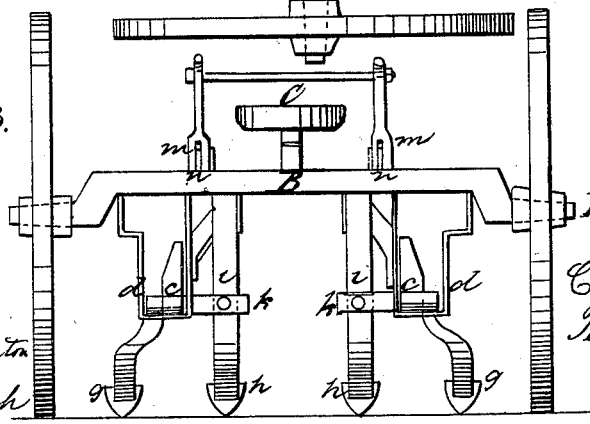

UNITED STATES PATENT OFFICE.

CHAS. DANIEL, OF LAMONTE, MISSOURI.

IMPROVEMENT IN CULTIVATORS.

Specification forming part of Letters Patent No. 57,484, dated August 28, 1866.

*To all whom it may concern:*

Be it known that I, CHARLES DANIEL, of Lamonte, in the county of Pettis, and State of Missouri, have invented a new and Improved Cultivator; and I do hereby declare that the following is a full, clear, and exact description thereof, which will enable others skilled in the art to make and use the same, reference being had to the accompanying drawings, forming part of this specification, in which—

Figure 1 is a sectional side view, taken at the line $x\ x$, Fig. 2. Fig. 2 is a plan. Fig. 3 is a rear view.

Similar letters of reference indicate like parts.

The object of this invention is to furnish farmers with a useful implement to facilitate the cultivation of Indian corn. It is made to travel on two wheels running between the rows, and works the rows of corn on both sides at once, there being two plow-beams connected with a center-beam, with two fixed cultivators to loosen the soil between the rows, and two vibratory cultivators under the control of the plowman for throwing more or less earth against the plants. It travels over the growing corn when quite high without injury to the plant, drawn by a double team, each horse between the rows, and the plowman can ride or walk at pleasure, a seat being provided, which can be swung out of the way when necessary. The frame is light and strongly braced.

A is the central draft-beam, firmly fixed at the rear end to the axle B, on which the wheels are hung. On the top of the beam A a driver's seat, C, is pivoted to swing forward out of the way when the plowman walks.

On the forward end of the draft-beam A is attached a double-tree or evener, D, and directly under it are firmly fastened on each side, with a bolt running through A, the hounds $a\ a$ in an oblique position downward and rearward, well braced with a small horizontal cross-bar, $b$, bolted on the ends to both hounds.

The plow-beams $c\ c$, Fig. 2, are attached at the front ends to the hounds $a\ a$, and their rear ends set in stirrups $d\ d$, shown plainly in Fig. 3, hanging under the axle B.

Long rod-braces $e\ e$, Fig. 2, are firmly fastened at one end to the outer ends of the axle, and are connected with the plow-beams at the other end, where one swivel-bolt secures the beams and the braces, and also the elbow draft-levers $f f$ to the hounds $a\ a$.

Upon the outside of the plow-beams $c\ c$ are fastened stationary cultivators $g\ g$, and on the inside are attached vibrating cultivators $h\ h$, which are suspended by pivot-bolts through the stocks $i\ i$ on arms $k\ k$ and swinging-rods $l\ l$, which run from the lower part of the plow-stocks to the hounds $a\ a$, and allow the cultivators to play to the right and left, as required. To the upper part of the stocks $i\ i$ are attached jointed handles $m\ m$, which act as levers for raising all of the cultivators clear of the ground when desired by bearing on the axle B as their fulcrum, in which position they are held by hooks or latches $n\ n$, on the under side of the handles, which catch on the axle, as shown in Figs. 1 and 2.

When the implement is at work the plow-beams $c\ c$ are held stationary in place by the stirrups $d\ d$, while the inside cultivators, $h\ h$, have free play sidewise to or from the corn to throw more or less earth to the rows, at the will of the plowman, by moving the handles $m\ m$ to the right or left, whether riding or walking.

When walking, the seat C is to be swung around forward out of the way, and the handles of the cultivators may be connected by a rod, (indicated in red lines, Fig. 3,) for managing both with one hand.

Having fully described the construction and operation of my invention, what I claim as new, and desire to secure by Letters Patent, is—

1. The jointed-handled and vibrating cultivators $h\ h$, in combination with the plow-beams $c\ c$, the axle B, and the hounds $a\ a$, constructed and operated substantially as and for the purposes herein described.

2. The suspended plow-beams $c\ c$, in combination with the hounds $a\ a$, and the stirrups $d\ d$, constructed and operated substantially as and for the purposes set forth.

3. The arrangement of the oblique-hanging hounds $a\ a$, in connection with the center-beam, A, the plow-beams $c\ c$, the side-braces, $e\ e$, and the axle B, constructed and applied substantially as and for the purposes herein specified.

4. The arrangement of the swinging seat C on the center-beam A, in combination with the vibrating cultivators $h\ h$, and their jointed handles $m\ m$ applied in connection therewith, substantially as and for the purposes herein described.

CHARLES DANIEL.

Witnesses:
I. W. BOBBITT,
J. W. ACRES.